United States Patent
Powell et al.

(10) Patent No.: US 9,430,475 B2
(45) Date of Patent: Aug. 30, 2016

(54) METHOD FOR PROVIDING INFORMATION TO A USER OF A MOTOR VEHICLE

(75) Inventors: Richard Powell, Warwickshire (GB); Carl Pickering, Warwickshire (GB); Peter Thomas, Leicestershire (GB)

(73) Assignee: Land Rover (GB)

( * ) Notice: Subject to any disclaimer, the term of this patent is extended or adjusted under 35 U.S.C. 154(b) by 508 days.

(21) Appl. No.: 12/990,433

(22) PCT Filed: May 1, 2009

(86) PCT No.: PCT/IB2009/051788
§ 371 (c)(1),
(2), (4) Date: Jan. 18, 2011

(87) PCT Pub. No.: WO2009/133535
PCT Pub. Date: Nov. 5, 2009

(65) Prior Publication Data
US 2011/0119614 A1 May 19, 2011

(30) Foreign Application Priority Data
May 1, 2008 (GB) .................................. 0807893.3

(51) Int. Cl.
G06F 3/00 (2006.01)
G06F 17/30 (2006.01)
G06F 3/01 (2006.01)

(52) U.S. Cl.
CPC ................................ G06F 17/30029 (2013.01)

(58) Field of Classification Search
USPC .......... 715/771, 769; 711/162, 163, 173, 170, 711/100, 103
See application file for complete search history.

(56) References Cited

U.S. PATENT DOCUMENTS

| | | | | |
|---|---|---|---|---|
| 5,587,575 A | * | 12/1996 | Leitner et al. | 235/384 |
| 6,314,422 B1 | * | 11/2001 | Barker et al. | 715/205 |
| 6,370,454 B1 | * | 4/2002 | Moore | 701/29.4 |
| 7,822,514 B1 | * | 10/2010 | Erickson | B60R 25/00 340/426.13 |
| 8,301,317 B2 | | 10/2012 | Placke et al. | |
| 8,721,084 B2 | * | 5/2014 | Mori | 353/14 |
| 2002/0070852 A1 | | 6/2002 | Trauner et al. | |

(Continued)

FOREIGN PATENT DOCUMENTS

| | | |
|---|---|---|
| CN | 1864184 A | 11/2006 |
| DE | 102005061505 A1 | 7/2007 |

(Continued)

OTHER PUBLICATIONS

English abstract for EP-1316478.

(Continued)

Primary Examiner — Toan Vu
(74) Attorney, Agent, or Firm — Fishman Stewart, PLLC (57) ABSTRACT

A method is disclosed in which a configuration code identifying the type and specification of a vehicle (1) is stored in a memory device (2) during manufacture of the vehicle (1). Information relating to one or more types of vehicle is uploaded into a mass storage device (3) located on the vehicle from an external data source (4). The stored configuration code is then used to select from the information stored on the mass storage device (3) only the information relating to the particular vehicle (1) so that only relevant information can be accessed by a user of the vehicle (1). The method may also include restricting the information provided if the vehicle speed is above a predetermined vehicle speed.

18 Claims, 5 Drawing Sheets

(56) References Cited

U.S. PATENT DOCUMENTS

| | | | |
|---|---|---|---|
| 2002/0080852 A1 | 6/2002 | Mirov | |
| 2002/0082751 A1* | 6/2002 | Obradovich et al. | 701/1 |
| 2002/0152264 A1 | 10/2002 | Yamasaki | |
| 2003/0065612 A1* | 4/2003 | Takaoka | 705/37 |
| 2003/0110468 A1* | 6/2003 | Maki | 717/106 |
| 2003/0120369 A1* | 6/2003 | Takaoka et al. | 700/95 |
| 2003/0132968 A1* | 7/2003 | Stewart et al. | 345/771 |
| 2003/0187753 A1* | 10/2003 | Takaoka | 705/26 |
| 2004/0049742 A1 | 3/2004 | Yokoyama et al. | |
| 2004/0083032 A1 | 4/2004 | Schnier et al. | |
| 2004/0139084 A1* | 7/2004 | Markow | 707/100 |
| 2004/0203696 A1* | 10/2004 | Jijina et al. | 455/420 |
| 2005/0040935 A1* | 2/2005 | Ewert | B60Q 5/00 340/384.2 |
| 2005/0071075 A1* | 3/2005 | Avery et al. | 701/115 |
| 2005/0107925 A1* | 5/2005 | Enigk | B60K 35/00 701/1 |
| 2005/0228556 A1* | 10/2005 | Kojima | 701/29 |
| 2005/0272478 A1* | 12/2005 | Larson et al. | 455/569.2 |
| 2006/0167630 A1* | 7/2006 | Noma et al. | 701/211 |
| 2006/0190144 A1* | 8/2006 | Ogasawara | 701/1 |
| 2006/0294514 A1* | 12/2006 | Bauchot et al. | 717/173 |
| 2007/0132564 A1* | 6/2007 | Dickmann et al. | 340/436 |
| 2007/0299577 A1* | 12/2007 | Hattori et al. | 701/32 |
| 2007/0300024 A1* | 12/2007 | Yokogawa | 711/161 |
| 2008/0114508 A1* | 5/2008 | Marx et al. | 701/36 |
| 2008/0125937 A1* | 5/2008 | Decke et al. | 701/36 |
| 2008/0183484 A1* | 7/2008 | Kondo et al. | 705/1 |
| 2008/0189006 A1* | 8/2008 | Meehan | G01C 22/02 701/31.4 |
| 2008/0222521 A1* | 9/2008 | Beck et al. | 715/273 |
| 2009/0096937 A1* | 4/2009 | Bauer | B60R 1/12 348/739 |
| 2009/0144622 A1* | 6/2009 | Evans | G06F 3/04886 715/706 |
| 2009/0187300 A1* | 7/2009 | Everitt et al. | 701/29 |
| 2009/0254248 A1* | 10/2009 | Park et al. | 701/36 |
| 2011/0202862 A1* | 8/2011 | Kramer et al. | 715/771 |
| 2012/0095927 A1* | 4/2012 | Hirtenstein et al. | 705/306 |
| 2012/0245765 A1* | 9/2012 | Medwin et al. | 701/2 |
| 2014/0058653 A1* | 2/2014 | Schofield et al. | 701/118 |
| 2014/0337976 A1* | 11/2014 | Moeller et al. | 726/23 |

FOREIGN PATENT DOCUMENTS

| | | |
|---|---|---|
| EP | 1316478 A2 | 6/2003 |
| EP | 1899197 A1 | 3/2008 |
| JP | 2001033256 A | 2/2001 |
| JP | 2002-160588 A | 6/2002 |
| JP | 2002-308024 A | 10/2002 |
| JP | 2003196092 A | 7/2003 |
| JP | 2005-300272 A | 10/2005 |
| JP | 2006044304 A | 2/2006 |
| JP | 2006199115 A | 8/2006 |
| WO | WO-03021422 A1 | 3/2003 |

OTHER PUBLICATIONS

English abstract for JP-2006199115.
English abstract for DE-102005061505.
Office Action and English translation for Japanese Application No. 2014-100648, dated Mar. 6, 2015, 11 pages.
English abstract for JP2002-160588.
English abstract for 2002-308024.
English abstract for CN-1864184.

* cited by examiner

METHOD FOR PROVIDING INFORMATION TO A USER OF A MOTOR VEHICLE

CROSS-REFERENCES TO RELATED APPLICATION

This application claims priority to International Patent Application PCT/IB2009/051788 filed on May 1, 2009, which claims priority to United Kingdom Patent Application GB 0807893.3, filed on May 1, 2008, which are both hereby incorporated by reference in their entirety.

The present invention relates to a method for providing information to a user of a motor vehicle and in particular to the provision of information in the form of a customised interactive manual for the vehicle.

It is known to provide a manual for a motor vehicle providing information regarding the vehicle and how to operate various functions of the vehicle such as for example a climate control system, an audio system, a navigation system and other vehicle based systems.

However a typical manual is normally common to a model of vehicle and is therefore large and complex and, as a consequence of this, many people do not bother to read the supplied manual. Such a manual is so large because it will contain a large percentage of information that is not relevant to the actual vehicle such as, for example, the operating instruction for all types of audio visual system that are fitted by the manufacturer to the vehicle type.

This failure to read the manual is a problem because, while some systems or devices may be usable without a manual, other systems or devices are more complicated and for correct operation require a manual to operate them. The failure to read the manual is therefore a potential cause of misuse or damage to a vehicle based system or device.

It is therefore an object of this invention to provide information to a user of a motor vehicle that is customised for their vehicle and easily accessed.

According to a first aspect of the invention there is provided a method for providing information to a user of a motor vehicle, the method comprises the steps of: storing a configuration code on the vehicle defining the specification of the vehicle, uploading to a mass storage device located on the vehicle information relating to more than one vehicle specification, disabling irrelevant information based upon the stored configuration code and providing access to the non-disabled information to the user of the motor vehicle.

Disabling irrelevant information may comprise preventing access to information not relevant to the vehicle.

Alternatively, disabling irrelevant information may comprise selecting information relevant to the vehicle based upon the configuration code.

Disabling irrelevant information may further comprise deleting information not relevant to the specification of vehicle.

Uploading to a mass storage device located on the vehicle information relating to more than one vehicle specification may comprise uploading to a mass storage device located on the vehicle information relating to more than one type of vehicle.

The method may further comprise updating the configuration code when the specification of the vehicle is altered so as to update the information available to the user according to a new specification of the vehicle.

Providing access to the non-disabled information to the user of the motor vehicle may further comprise determining the speed of the vehicle and altering the access provided to the user based upon whether the vehicle speed is above or below a predetermined speed threshold.

The information may be supplied by means of at least one of an audible output and a display and, when the speed of the vehicle is above the predetermined speed threshold, the information supplied via the display may be restricted.

The display may be a graphical user interface and, when the speed of the vehicle is above the predetermined speed threshold, the type of information available for selection via the graphical user interface may be restricted.

When the speed of the vehicle is above the predetermined speed threshold, only audible information may be supplied to the user.

When the vehicle speed is above the predetermined speed threshold, only graphical information may be supplied via the display to the user.

According to a second aspect of the invention there is provided a method for providing information to a user of a motor vehicle, the method comprises the steps of: storing on a mass storage device located on the vehicle information relating to the vehicle, providing access to the information to the user of the motor vehicle, determining the speed of the vehicle and altering the access provided to the user based upon whether the vehicle speed is above or below a predetermined speed threshold.

The information may be supplied by means of at least one of an audible output and a display and, when the speed of the vehicle is above the predetermined speed threshold, the information supplied via the display may be restricted.

The display may be a graphical user interface and, when the speed of the vehicle is above the predetermined speed threshold, the type of information available for selection via the graphical user interface may be restricted.

When the speed of the vehicle is above the predetermined speed threshold, only audible information may be supplied to the user.

When the vehicle speed is above the predetermined speed threshold, only graphical information may be supplied via the display to the user.

According to a third aspect of the invention there is provided a motor vehicle having a mass storage device to store information relating to more than one vehicle specification, a memory device to store a configuration code identifying the specification of the vehicle and a means to provide information regarding the motor vehicle in response to an input from a user of the vehicle wherein the information accessible to the user is based upon the configuration code stored in memory so that only relevant information is provided.

According to a fourth aspect of the invention there is provided a motor vehicle having a mass storage device to store information and means to access the information stored on the mass storage device regarding the motor vehicle in response to an input from a user of the vehicle wherein the access provided to the user is altered based upon whether the vehicle speed is above or below a predetermined speed threshold.

The invention will now be described by way of example with reference to the accompanying drawings of which:—

Figure 1:
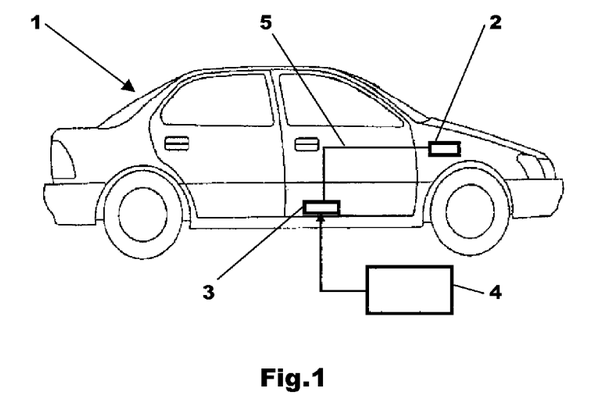
FIG. 1 is a side view of a motor vehicle showing the motor vehicle during one stage of assembly.
Figure 6:
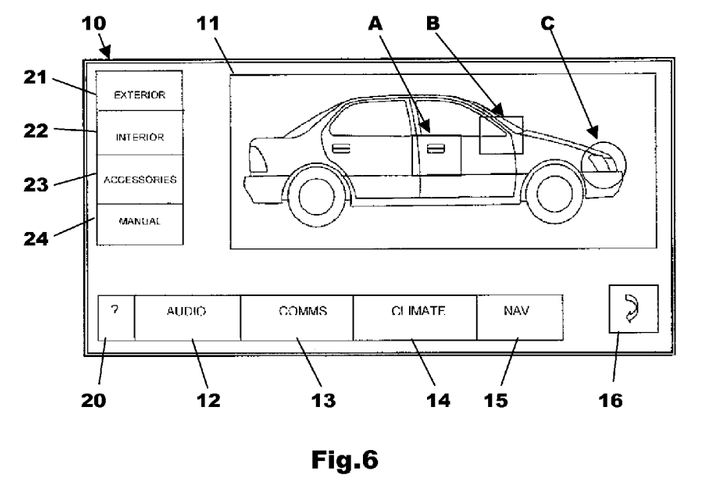
FIG. 6 is a front view of a graphical user interface forming part of the motor vehicle shown in FIG. 1.

Referring now to FIGS. 1 and 6 there is shown a motor vehicle 1 having a body controller 2 including memory and a mass storage device 3 connected to the body controller 2 by a CAN 5. It will be appreciated that the configuration code can be stored in any memory device located on the motor vehicle 1 and that the invention is not limited to a motor vehicle 1 having a body controller 2.

The motor vehicle 1 also includes various sensors (not shown) to monitor operation of the motor vehicle 1 including a sensor to measure vehicle speed.

The motor vehicle 1 includes a graphical user interface 10 for use in accessing information relating to the motor vehicle, and for operating various systems on the motor vehicle 1.

The graphical user interface 10 includes a display portion 11, a number of touch sensitive panels 12, 13, 14, 15 for making control function requests. In this case, the touch sensitive panels 12, 13, 14 and 15 respectively request control menus for an audio system, a communications system, a climate control system and a navigation system but it will be appreciated that other system controls could be added to or could replace those shown.

Pressing one of the panels 12, 13, 14 and 15 will cause the display 11 to change to one related to the request control function from which functions of the respective system can be adjusted or changed.

The graphical user interface also includes touch sensitive return panel 16 which is used to return the display 11 to a default mode when any of the various control functions have been completed.

The graphical user interface 10 also includes touch sensitive panels 20, 21, 22, 23 and 24 for accessing information stored in the mass storage device 3 relating to the motor vehicle 1.

In this case, the touch sensitive panels 21, 22, 23 and 24 respectively request information relating to exterior features, interior features, accessories and index based textual information relating to all fitted systems and features. The touch sensitive panel 20 is used to enter an information mode in which the panels 21, 22, 23 and 24 become active. In some embodiments the panels 21, 22, 23 and 24 are hidden from view until the panel 20 is pressed thereby allowing the area of the display 11 to be increased. Pressing the panel 16 at any time returns the display to the default mode and exits the information mode.

It will be appreciated that the invention is not limited to the use of a touch screen graphical user interface and a display with conventional push buttons could be used.

Figure 2:
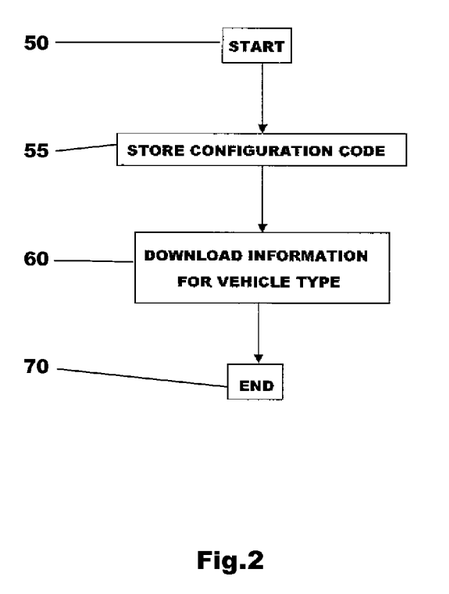
FIG. 2 is a flow chart showing a first part of a method according to a first embodiment of the invention.

As shown in FIG. 2, after starting assembly of the motor vehicle 2 at block 50, a configuration code is stored in the body controller 2. The configuration code comprehensively identifies the specification of the motor vehicle 1 including details regarding the equipment fitted, the type of equipment fitted the type and specification of the engine, the type of transmission fitted etc.

Then during assembly as indicated in block 60 and shown in FIG. 1 the mass storage device 3 is uploaded with information relating to the vehicle type from a remote database 4. As shown in FIG. 1 this is by way of direct transfer using a lead connected to an USB port on the mass storage device 3. However, it will be appreciated that the uploading could also be affected by the use of transferable media such as a DVD disc that is inserted into a drive located on the mass storage device 3 so as to permit the transfer of data to the mass storage device 3.

The information uploaded comprises the information for all variants of the same vehicle type and constitutes an electronic manual accessible to a user of the motor vehicle.

Figure 4:
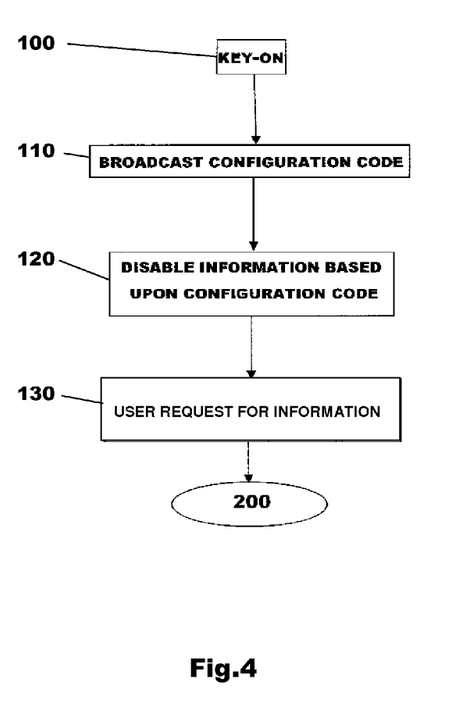
FIG. 4 is a flow chart showing a second part of a method according to the invention.
Figure 5:
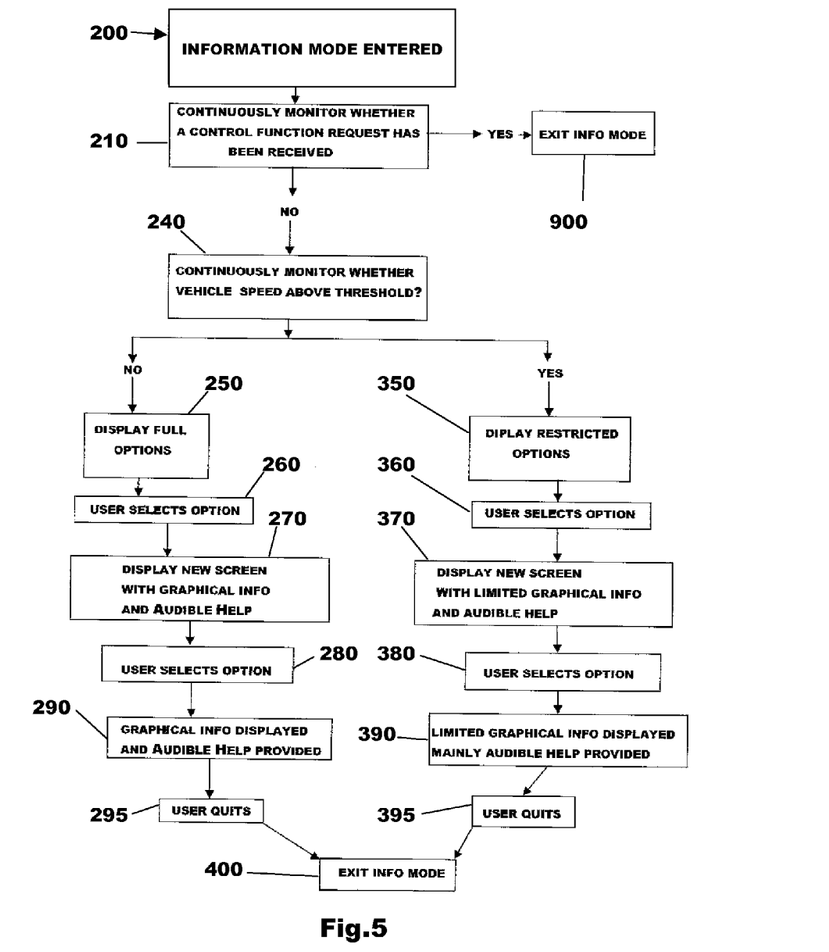
FIG. 5 is a flow chart showing a third part of a method according to the invention.

Referring now to FIGS. 4 to 6 there is shown the operations performed during use of the motor vehicle 1.

Referring first to FIG. 4 after a key-on event (or an ignition event when the vehicle does not have a key to start the engine but a stop/start button) at block 100 the configuration code stored in the body controller 2 is broadcast or made available to all other electronic devices via the CAN 5 and in particular to the mass storage device 3.

Then at block 120 the mass storage device 3 is operable to use the configuration code to determine which parts of the uploaded information are relevant to the motor vehicle 1 and disables those parts that are not relevant.

The irrelevant information may be disabled by preventing access to the information or by selecting information relevant to the motor vehicle 1 based upon the configuration code and storing it in a separate location in the mass storage device 3 for access by the user of the motor vehicle 1. In either case the user is only able to access information relevant to the motor vehicle 1. For example, if the motor vehicle has full automatic climate control fitted, then all information relating to manual air conditioning or non-air conditioning systems is not accessible to the user.

When a user makes a request for information as indicated in block 130 by pressing panel 20 (FIG. 6) the information mode is entered as indicated at block 200 on FIG. 5.

While the graphical user interface 10 is in the information mode, as depicted in FIG. 6, the function control panels 12, 13, 14 and 15 are continuously monitored as indicated in block 210 and if any of the control function panels 12, 13, 14 and 15 is touched the information mode is immediately exited as indicated in block 900. That is to say, at all times priority is given to the control of vehicle functions.

Assuming no control function request has been received then at block 240 the speed of the motor vehicle 1 is determined and compared to a predetermined threshold which is a very low vehicle speed. The vehicle speed may, for example and without limitation, be in the range 1 to 20 Kph.

If the speed of the motor vehicle 1 is less than the predetermined vehicle speed, the blocks 250 to 295 are executed and, if the speed is above the predetermined speed, the blocks 350 to 395 are executed.

Assuming firstly that the speed of the motor vehicle 1 is below the predetermined speed then, at block 250, the full range of options is displayed. That is to say all of the panels 21 to 24 are visible and active.

Then, as indicated in block 260, a user may select one of the various options such as for example by touching the exterior panel 21. This causes a new screen to be displayed as indicated in block 270 and may also provide audible help or guidance. A typical exterior screen display corresponding to block 270 is shown in FIG. 6 where it can be seen that three areas 'A', 'B' and 'C' are highlighted on the display 11. The areas 'A', 'B' and 'C' are features of the motor vehicle 1 for which information or help is available. It will be appreciated that similar screens are accessible via the interior and accessory panels 22 and 23. The manual panel 24 causes the display of text which can be scrolled through or searched via a touch screen keyboard.

Then, as indicated at block 280, a user selects the required option by pressing one of the areas 'A', 'B' and 'C'. For example, if the area 'C' is touched the information relating to exterior lighting will be displayed, as indicated in block 290, and audible information or help may also be provided.

As indicated in block 295 when the user is finished the panel 16 is pressed and, as indicated in block 400, the information mode is exited. As an alternative, the touching once of the panel 16 may cause the method to return to block 240 and pressing it twice will cause the information mode to be exited.

Assuming now that the speed of the motor vehicle 1 is above the predetermined speed then, at block 350, only a restricted range of options is displayed. That is to say, the panels 21 to 23 are visible and active but the panel 24 is dimmed or not displayed.

Then, as indicated in block 360, a user may select one of the various options such as for example by touching the exterior panel 21. This causes a new screen to be displayed as indicated in block 370 and may also provide audible help or guidance. A typical exterior screen display is shown in FIG. 6 and has been described above and so will not be described again in detail.

Then, as indicated at block 380, a user selects the required option by pressing one of the highlighted areas 'A', 'B', and 'C' for example if the area 'C' is touched, limited information relating to exterior lighting will be displayed as indicated in block 390 and audible information or help will be provided. That, is to say the information will primarily be provided by an audible output but a supporting diagram or graphic may be displayed to accompany the audible output. Unlike block 290, no detailed text will be displayed because it is not safe to read detailed text while the vehicle 1 is travelling at speed.

As indicated in block 395, when the user is finished with the information mode, the panel 16 is pressed and, as indicated in block 400, the information mode is exited. As an alternative, the touching once of the panel 16 may cause the method to return to block 240 and pressing it twice will cause the information mode to be exited.

Therefore in summary the information provided is dependent upon the speed of the motor vehicle 1 thereby allowing full and complete information including text to be displayed below the predetermined speed threshold but inhibiting the text displayed above the speed threshold.

Figure 3:
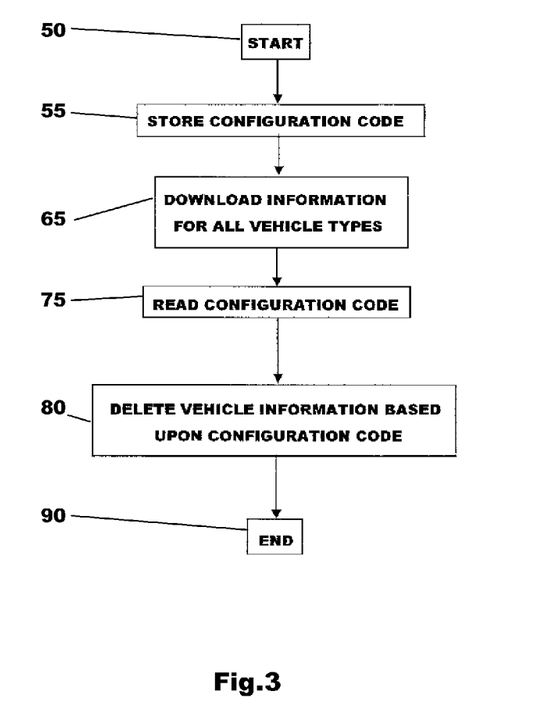
FIG. 3 is a flow chart showing a first part of a method according to a second embodiment of the invention.

Referring now to FIG. 3, there is shown an alternative method to the method shown in FIG. 2.

The method commences at block 50 and then at block 55 the configuration code is stored in the body controller 2. Then, at step 65, the information for all vehicle models (types) made by the manufacturer are uploaded into the mass storage device 3. That is to say, if the manufacturer manufactures a saloon model, a sports model and a 4×4 model the information for all of these models is uploaded into the mass storage device 3. Then at block 75 the configuration code is read and in block 80 information not relating to the particular model of vehicle is deleted so that, in effect, the mass storage device 3 is left only with the information it would have received in block 60 on FIG. 2

The method then ends at block 90 and the motor vehicle 1 then operates as previously described with reference to FIGS. 4 to 6.

The advantage of this approach is that a manufacturer can use the same type of mass storage device for all of the models it makes and either upload these prior to assembly to the motor vehicle with all of the information for all models or, during assembly, upload the same information to every vehicle passing down the production line irrespective of the model type or specification of the vehicle.

Then, either as part of the assembly process or at a first key-on or ignition-on event, the information relating to other models is deleted. This technique simplifies the manufacturing process particularly when different models travel down the same production line and reduces cost.

It will be appreciated that, preferably, the configuration code can be updated during use of the vehicle 1 by connecting a device to the body controller 2 such as, for example, a diagnostic service tool. This enables the information supplied to the user to be customised based upon variations in vehicle specification.

For example, if a towing bracket is fitted to the motor vehicle 1 by a dealer, the configuration code is changed by the dealer to indicate this. The next time the motor vehicle 1 is used the configuration code will have changed and the information relating to the fitted towing bracket can now be accessed by the user whereas before it was not accessible. Similarly, if the motor vehicle 1 is sold in a country other than the country for which it was manufactured or a new owner is more familiar with a different language then a dealer or a person having the appropriate device could change the configuration code so as to present information in this alternative language. This might be advantageous for example to hire companies renting vehicles to persons from various countries.

The invention claimed is:

1. A method for providing information to a user of a motor vehicle, wherein the method comprises the steps of: storing a configuration code on the vehicle defining the predetermined specification of that specific vehicle, the information providing guidance regarding how to operate functions of the vehicle, the guidance representing an electronic manual, uploading to a mass storage device located on the vehicle information relating to more than one vehicle specification, disabling irrelevant information based upon the stored configuration code in response to an initial activation event and providing access to the non-disabled information to the user of the vehicle, wherein the non-disabled information corresponds to vehicle specific guidance regarding how to operate a particular function of the vehicle based on the specification applicable to that specific vehicle;

wherein the vehicle specific guidance is represented by the configuration code;

wherein the method further comprises the step of updating the configuration code when the specification of the vehicle is altered subsequent to the initial activation event so as to update the non-disabled information available to the user according to a new specification of the vehicle; and receiving a request via a graphical user interface to access the updated information and presenting a plurality of selectable options on a display for selection by the user each representing vehicle specific guidance of the updated information, and providing at least one of an audible instruction and a visual instruction of the vehicle specific guidance in response to selecting at least one of the plurality of selectable options;

wherein providing access to the non-disabled information to the user of the vehicle further comprises determining the speed of the vehicle and restricting the access provided to the user on the display when the vehicle speed is above a predetermined speed threshold; and wherein the information is supplied via at least one of an audible output and a visual output and, when the speed of the vehicle is above the predetermined speed threshold, the information supplied via the visual output is restricted;

wherein disabling irrelevant information comprises selecting information relevant to the vehicle based upon the configuration code and storing the relevant information in a separate location in the mass storage device; and wherein disabling irrelevant information further comprises deleting from the mass storage device information not relevant to the vehicle specification.

2. A method as claimed in claim 1 wherein disabling irrelevant information comprises preventing access to information not relevant to the vehicle.

3. A method as claimed in claim 1 wherein uploading to a mass storage device located on the vehicle information relating to more than one vehicle specification comprises uploading to a mass storage device located on the vehicle information relating to more than one type of vehicle.

4. A method as claimed in claim 1 wherein, when the speed of the vehicle is above the predetermined speed threshold, only audible information is supplied to the user.

5. A method as claimed in claim 1 wherein, when the vehicle speed is above the predetermined speed threshold, only graphical information is supplied via the display to the user.

6. A method as claimed in claim 1 the configuration code being the same so long as the vehicle specification remains unchanged.

7. A method as claimed in claim 1 wherein the configuration code is stored in a controller, the method further comprising selectively broadcasting the configuration code to the mass storage device.

8. A method as claimed in claim 7 the broadcasting taking place upon the initial activation event, wherein the initial activation event includes at least one of a key-on-event and an ignition event.

9. A method as claimed in claim 1 wherein the functions of the vehicle comprise at least one of a climate control system, an audio system and a navigation system.

10. A motor vehicle, comprising: a mass storage device to store information relating to more than one vehicle specification, the information providing guidance regarding how to operate functions generic to at least the same vehicle type of the vehicle, the guidance representing an electronic manual, a memory device to store a configuration code identifying the predetermined specification applicable to that specific vehicle and a mechanism to provide information after an initial activation event regarding the motor vehicle in response to an input from a user of the vehicle, wherein the information accessible to the user is based upon the configuration code stored in memory so that only relevant information is provided and irrelevant information is disabled the relevant information corresponding to vehicle specific guidance regarding how to operate a particular function of the vehicle based on the specification applicable to that specific vehicle;

wherein the vehicle specific guidance is represented by the configuration code;

a graphical user interface arranged to provide the vehicle specific guidance for selection by the user via a plurality of selectable options presented on a display, wherein at least one of an audible instruction and a visual instruction is provided in response to the user selecting at least one selectable option; and wherein the display is arranged to provide access to the information when the vehicle speed is below a predetermined threshold and, when the vehicle speed is above the predetermined threshold, the access provided on the display is restricted;

wherein the information is supplied via at least one of an audible output and a visual output and, when the speed of the vehicle is above the predetermined speed threshold, the information supplied via the visual output is restricted;

wherein the irrelevant information is disabled by selecting information relevant to the vehicle based upon the configuration code and storing the relevant information in a separate location in the mass storage device, and information not relevant to the vehicle specification is deleted from the mass storage device;

wherein the configuration code is updatable when the specification of the vehicle is altered so as to update the information available to the user according to a new specification of the vehicle.

11. A motor vehicle as claimed in claim 10, the memory device being arranged to broadcast the configuration code to the mass storage device.

12. A motor vehicle as claimed in claim 11 comprising a CAN network wherein the memory device is arranged to broadcast the configuration code to the mass storage device via the CAN network.

13. A non-transitory computer-readable medium tangibly embodying computer-executable instructions for providing information to a user of a motor vehicle, the instructions being executable by a vehicle processor to provide operations comprising:

identifying a stored configuration code on the vehicle defining the predetermined specification of that specific vehicle;

accessing in a mass storage device located on the vehicle information relating to more than one vehicle specification, the uploaded information providing guidance regarding how to operate functions generic to at least the same vehicle type of the vehicle, the guidance representing an electronic manual;

disabling irrelevant information based upon the stored configuration code in response to an initial activation event and providing access to the non-disabled information to the user of the vehicle, wherein disabling irrelevant information comprises selecting information relevant to the vehicle based upon the configuration code and storing the relevant information in a separate location in the mass storage device, and deleting from the mass storage device information not relevant to the vehicle specification; and receiving a request via a graphical user interface to access the relevant information from the separate location in the mass storage device and providing a plurality of selectable options on a display for selection by the user of the vehicle in response to the request, the plurality of selectable options each representing vehicle specific guidance regarding how to operate a particular function of the vehicle based on the specification applicable to that specific vehicle, wherein the vehicle specific guidance is represented by the configuration code;

wherein providing a plurality of selectable options on the display further comprises determining the speed of the vehicle and restricting access to the plurality of selectable options on the display when the speed of the vehicle is above a predetermined speed threshold;

wherein the information is supplied via at least one of an audible output and a visual output and, when the speed of the vehicle is above the predetermined speed threshold, the information supplied via the visual output is restricted;

wherein the configuration code is updatable when the specification of the vehicle is altered so as to update the information available to the user according to a new specification of the vehicle.

14. A non-transitory computer readable medium as claimed in claim 13, wherein disabling irrelevant information comprises preventing access to information not relevant to the vehicle.

15. A non-transitory computer readable medium as claimed in claim 13, wherein the uploaded information comprises information relating to more than one type of vehicle.

16. A non-transitory computer readable medium as claimed in claim 13, wherein the configuration code is the same so long as the vehicle specification remains unchanged.

17. A non-transitory computer readable medium as claimed in claim 13, wherein, when the speed of the vehicle is above the predetermined speed threshold, only audible information is supplied to the user.

18. A non-transitory computer readable medium as claimed in claim 13, wherein, when the vehicle speed is above the predetermined speed threshold, only graphical information is supplied via the display to the user.

* * * * *